Aug. 8, 1961  G. A. LYON  2,995,403
WHEEL COVER
Filed May 8, 1957  3 Sheets-Sheet 2
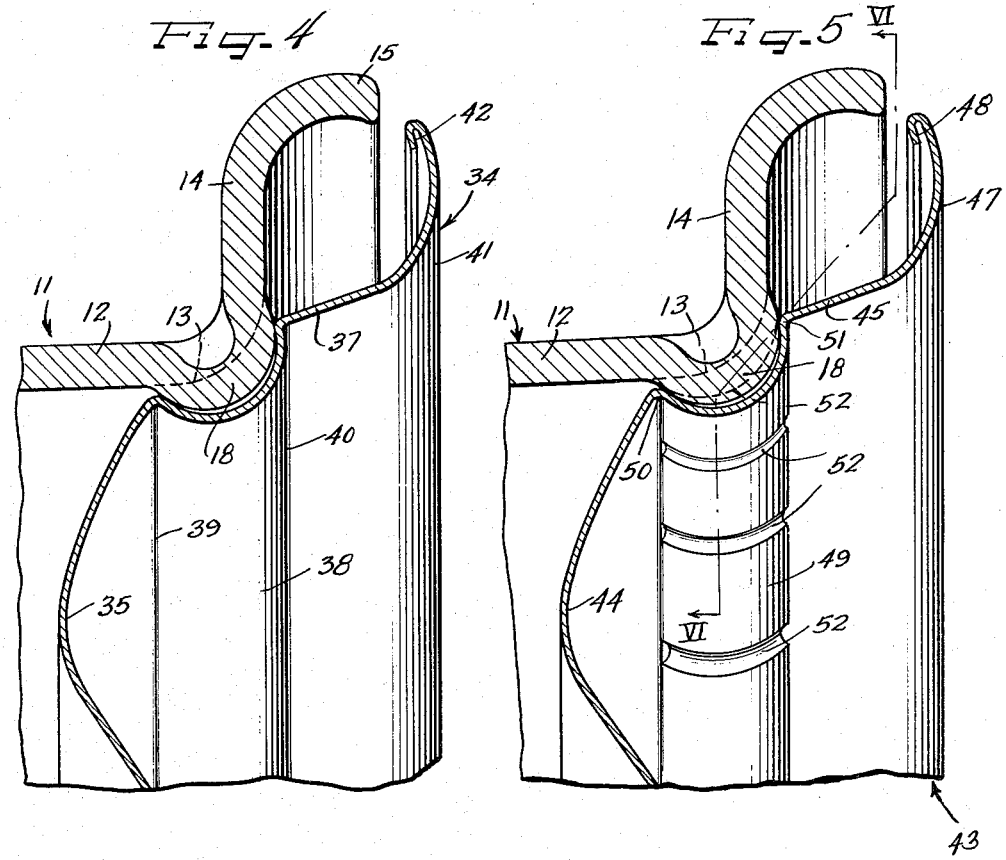
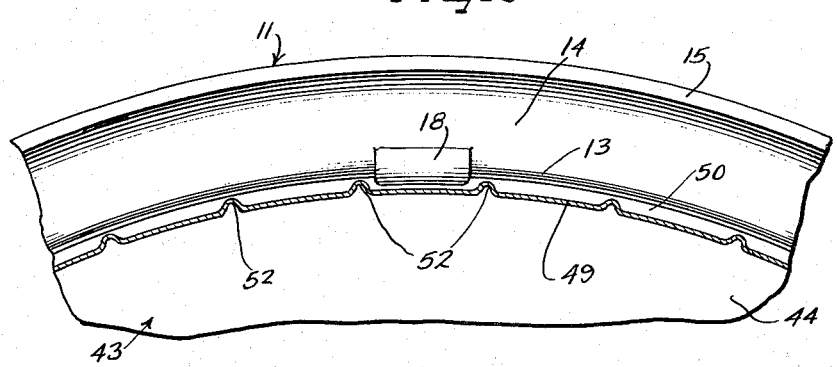
Inventor
GEORGE ALBERT LYON
by Hill, Sherman, Meroni, Gross & Simpson
Attys.

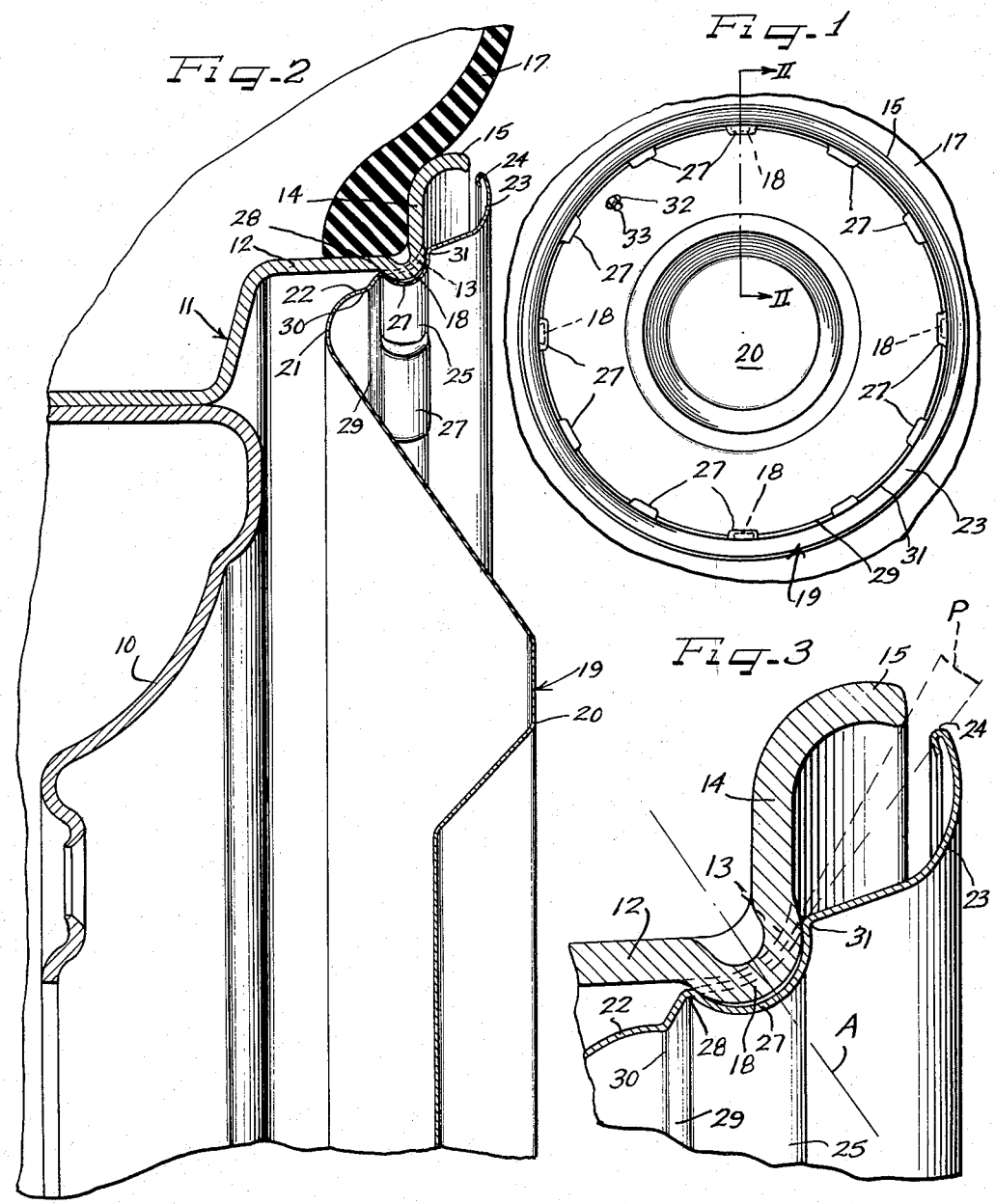

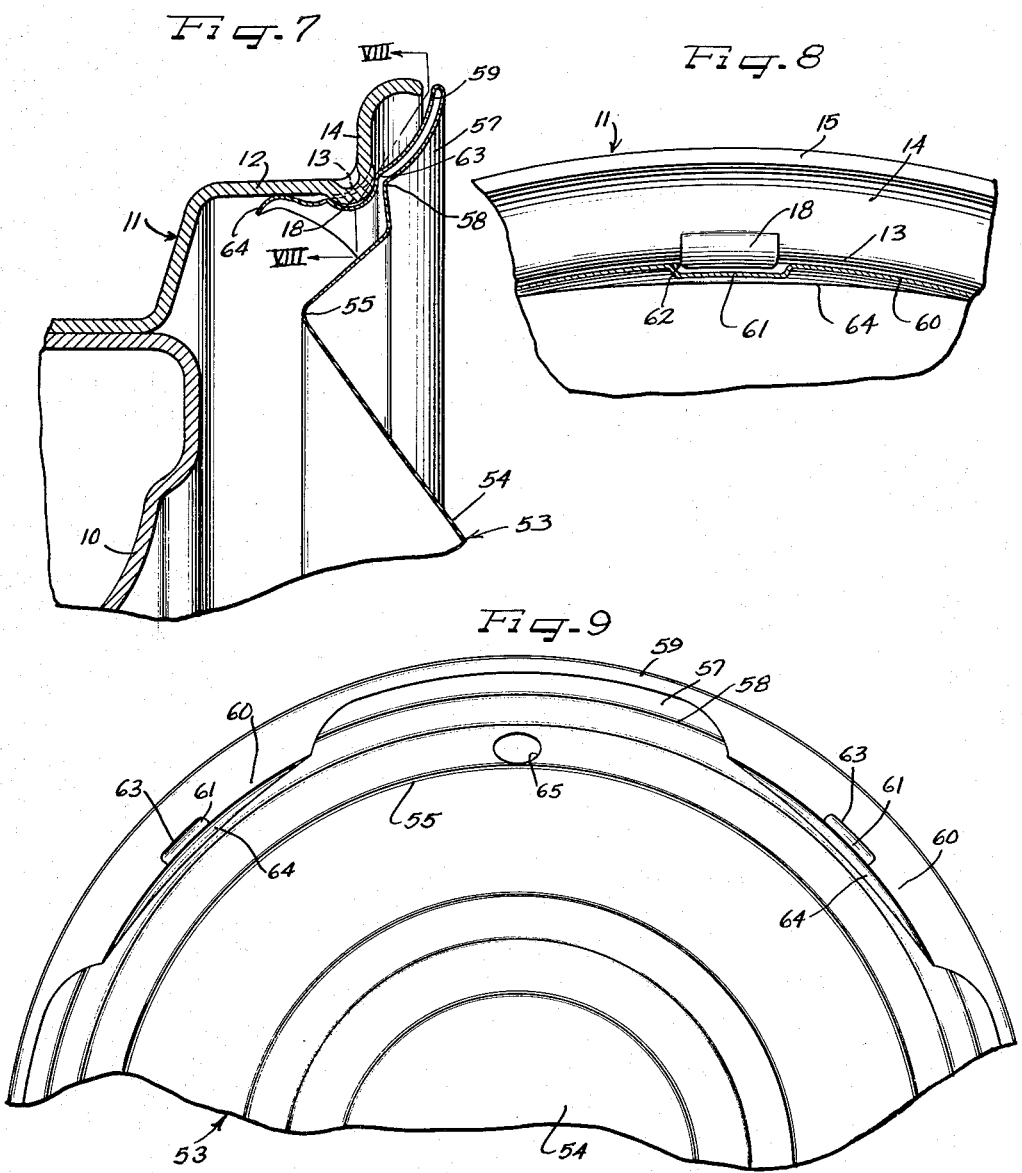

United States Patent Office 2,995,403
Patented Aug. 8, 1961

2,995,403
WHEEL COVER
George Albert Lyon, 13881 W. Chicago Blvd.,
Detroit 28, Mich.
Filed May 8, 1957, Ser. No. 657,941
7 Claims. (Cl. 301—37)

The present invention relates to improvements in wheel structures and more particularly concerns the ornamental and protective covering of the outer sides of vehicle wheels.

There is presently considerable emphasis upon economy in automobile accessories of which wheel covers are, of course, of substantial importance both as original equipment or optional equipment. Most wheel covers must be made from material of fairly high grade and thus cost savings that can be effected in the amount of material necessary in the production of wheel covers are important.

An important object of the present invention is to provide a wheel structure including a cover construction that can be produced economically for press-on, pry-off engagement with novel retaining means on the wheel.

Another object of the invention is to provide improved retaining means for snap-on, pry-off engagement with retaining means on a cover construction.

A further object of the invention is to provide in a wheel structure an improved retaining coaction between retaining means on the wheel and retaining means on the wheel cover.

Still another object of the invention is to provide an improved manner of attaching and supporting wheel covers on the tire rims of vehicle wheels.

Yet another object of the invention is to provide improved cover retaining bump structure for vehicle wheel rims.

Other objects, features and advantages of the present invention will be readily apparent from the following detailed description of certain preferred embodiments thereof taken in conjunction with the accompanying drawings in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a sectional detail view similar to FIGURE 2 but showing certain portions on substantially enlarged scale;

FIGURE 4 is a radial sectional detail view through a wheel structure showing a modification in the cover;

FIGURE 5 is another radial sectional detail view showing a further modified cover;

FIGURE 6 is a sectional elevational view taken substantially on the line VI—VI of FIGURE 5;

FIGURE 7 is a fragmentary radial sectional detail view through the wheel showing a further modification of the cover;

FIGURE 8 is a sectional elevational detail view taken substantially on the line VIII—VIII of FIGURE 7; and FIGURE 9 is a fragmentary rear or inner side elevational view of the cover of FIGURES 7 and 8.

Several forms of cover are shown herein, all adapted to be applied to the outer side of a vehicle wheel as shown in FIGURE 2 including a disk spider wheel body 10 supporting a multi-flange, drop center tire rim 11 including a generally axially outwardly extending and slightly radially outwardly sloping intermediate flange 12 which joins on a transversely rounded juncture shoulder 13 at its axially outer extremity with a terminal flange including generally radially outwardly extending portion 14 merging into a generally axially outwardly extending lip extremity portion 15. A pneumatic tire 17 which may be of the tubeless type is adapted to be supported by the tire rim.

Especially where the pneumatic tire 17 is of the tubeless variety, so that the tire rim 11 coacts with the beads of the tire to provide an air chamber for inflation of the tire, it is highly desirable to avoid any breaks, indentations, gaps or other non-conformity in the surfaces of the tire rim that are engaged sealingly by the tire rim bead. Of course, the surfaces that are so engaged by the tire rim bead are the opposing faces of the intermediate flange 12 in the axially outer portion thereof and the terminal flange portion 14. However, retaining bumps pressed in the tire rim and more particularly the intermediate flange 12 are a convenient means for providing shoulder structure engageable with coacting shoulder structure on a wheel cover for retaining the cover on the wheel. The pressing of such retaining bumps often times results in slight fracturing of the material in the area of pressing out or embossing of the bumps, and through which fractures air may leak. Moreover, where the retaining bumps are located short of the axially outer or terminal flange juncture extremity of the intermediate flange, there is such a narrow engagement of the tire rim bead with the adjacent rim flange surfaces and especially at the axially inner sides of the bumps that liability of leakage thereby into the recess of the embossed bump frequently occurs.

By the present invention, however, these disadvantages and problems of tire rim flange retaining bumps are overcome since retaining bumps 18 are provided (FIGS. 2 and 3) which are derived only partially from material of the intermediate flange 12. Primarily the retaining bumps 18 are derived from material of the juncture 13 between the intermediate flange 12 and the terminal flange portion 14, but also partially from material of the terminal flange portion 14 adjacent to the juncture. In embossing the retaining bumps 18, displacing pressure by means of suitable die or punch structure is applied on an axis A as indicated in dot dash line in FIGURE 3 about on the center of the curvature of the juncture 13. Thereby, the wall thickness of the bump 18 is substantially uniform transversely of the bump with only slight elongation while the depth of the embossing recess is less than the thickness of the tire rim material at the juncture 13. It will be observed that there is substantially equal bulging of the bump 18 generally axially outwardly and radially inwardly from the intermediate flange and terminal flange portions of the juncture 13 at each side of the embossing axis A. Such bulging is radially inwardly beyond the plane of the axially outer portion of the intermediate flange 12 of the tire rim and axially outwardly beyond the plane of the radially inner portion of the terminal flange portion or section 14. It may also be observed that the bump 18 is of substantial depth, that is the dimension from the point at which the bump surface merges with the inner surface of the intermediate flange 12 and the point at which the bump merges with the outer surface of the terminal flange portion 14.

It will be observed in FIGURE 2 that only a small area at the heel extremity of the bead of the tire 17 overlaps or is superimposed over the bump recess. By far the major portion of the tire bead surface that opposes the intermediate flange 12 is in direct sealing engagement with the rim flange surface axially inwardly from the retaining bump recess. Likewise, virtually all of the radially outwardly facing surface of the tire bead engages in direct sealing engagement with the inner face of the terminal flange portion 14. Thus danger of leakage into or through the bump recess is effectively precluded.

As shown in dotted lines in FIGURE 1, there may be four of the retaining bumps 18 equally spaced circumferentially on the tire rim. As best seen in FIGURES 6 and 8, the retaining bumps 18 are of substantial though limited width.

The particular construction and relationship of the retaining bumps enables an especially desirable, efficient cover construction and retaining interengagement of the cover with the bumps. In one form, a cover 19 (FIGS. 1, 2 and 3) may be provided including a central crown portion 20 for overlying the wheel body 10, having thereabout a shallow annular axially inwardly dished intermediate portion 21 providing a generally radially and axially outwardly angled annular portion 22 for overlying the tire rim and more particularly the juncture 13 and terminating in generally radially outwardly turned marginal portion 23 extending to a diameter to substantially overlie or at least extend adjacent to the tip of the terminal flange lip 15. A short underturned reinforcing and finishing flange 24 at the extremity of the marginal portion 23 provides a smooth edge and stiffening for the cover extremity.

For snap-on, pry-off interengagement with the retaining bumps 18, the radially outer annular slanted cover portion 22 is provided with socket or pocket structure receptive of the retaining bumps and affording bump engaging shoulders. Herein the construction and arrangement is such that the cover is not only retained by the bumps 18, but is entirely supported thereby. To this end, the cover portion 22 is provided with an annular shallow axially outwardly and radially inwardly projecting rib 25 dimensioned to oppose the tire rim flange juncture 13 in slightly spaced clearance relation and with the width of the rib 25 such as to provide a groove opposing the juncture 13 which is slightly less than the total depth of the retaining bumps 18, bump receiving pockets 27 being embossed in the rib 25 to project generally axially outwardly and radially inwardly to afford clearance freely receptive in spaced relation of the respective retaining bumps. Thereby, a bump gripping shoulder 28 at the axially inner side of the rib 25 is retainingly engageable in snap-on, pry-off relation with the generally radially and axially inwardly facing shoulder provided by the respective bump 18. The shoulder 28 is common to all of the pocket embossments 27 and is resiliently reinforced or strengthened by a narrow annular bracing flange 29 that extends obliquely generally radially and axially inwardly therefrom and joins the axially inner portion of the cover panel or flange portion 22 on a reinforcing annular bend rib 30.

At the axially outer side of the rim flange juncture clearance channel rib 25 in an annular shoulder rib 31 located in radially and axially outwardly offset relation to the shoulder 28 and engageable in seating, cover supporting relation with the axially outer side of the retaining bumps 18 where the same bulge from the terminal flange portion 14.

By having the portion of the cover that opposes and lies next adjacent to the rim flange juncture shoulder 13 held clear of such juncture shoulder, a more resiliently flexible, tensioned engagement of the retaining bumps 18 by and between the retaining shoulders 28 and the seating shoulders 31 is attainable since there is no interference with thorough bump-gripping engagement of the cover shoulders by any counteracting forces or pressures that might otherwise develop where portions of the cover between the bumps or elsewhere might exert an uneven and incalculable resistance due to various variables in the structures. Since the cover 19 is made from a material such as stainless steel, brass, aluminum alloy, or the like worked to substantial resilient hardness, the cover is adequately resiliently flexible to accommodate a substantial manufacturing tolerance range in the retaining and shoulder structures 28 and 31 and the adjacent structural features of the cover.

In applying the cover to the outer side of the wheel, a valve stem aperture 32 is registered with a valve stem 33 that projects from the tire rim and in so doing one or two of the retaining bumps 18, of which there may be four as shown, are engaged in respective ones of the pocket embossments 27. This is especially facilitated by the generally radially and axially outward projection of the bumps 18 toward which the cover is generally brought in a canted position toward the valve stem 33. Then, the cover is swung about the engaged bumps toward the opposite side of the wheel and the retaining shoulder portions 28 at the bump receiving embossment pockets 27 at the opposite side of the cover are cammed over the associated retaining bumps and snapped in behind the respective retaining bumps. In the finally assembled relationship of the cover to the wheel, the cover is held in centered, cushioned, retained engagement on the wheel and more particularly the tire rim and in fully spaced relationship to all parts of the wheel except for the engagement of the retaining shoulder portions 28 and the seating shoulder portions 31 with the retaining bumps 18.

Turning of the cover on the wheel is effectively precluded by the opposition of the sides of the bump receiving embossment portions 27 to the sides of the retaining bumps.

Furthermore, by the substantial chambered relationship between the tire rim terminal flange portions 14 and 15 and the overlying cover marginal portion 23, an ample space for accommodating wheel balancing weights is provided.

For removing the cover 19 from the outer side of the wheel, a pry-off tool such as a screwdriver, and indicated at P in FIGURE 3, may be inserted into the gap between the edge 24 of the cover and the tip of the terminal flange lip portion 15 and pry-off force applied to the shoulder 31 either between the retaining bumps or directly at one of the retaining bumps 18, the location of which is easily determinable by the location of the embossments 27 and orientation relative to the valve stem 33.

It may be observed in FIGURE 1 that instead of providing only an equal number of the embossments 27 to the retaining bumps 18, there may be an ornamentally attractive greater series of such embossments 27 which, although they may be dummies, provide a pleasing ornamental effect.

In the modification of FIGURE 4, a cover 34 is provided for disposition at the outer side of the wheel and may be made from suitable sheet material such as stainless steel, brass, aluminum alloy, or the like similarly as the cover 19, with any suitable central or crown portion, with an intermediate annular inwardly dished portion 35 thereabout leading to a radially outer cover portion 37 having an annular radially inwardly and axially outwardly bulged rib-channel formation 38 of a depth to clear the retaining bumps 18 in spaced relation and of a width to provide at the axially inner side of the rib a bump engaging resilient retaining shoulder 39 and at the axially outer side of the rib a seating annular shoulder 40, the spacing of the shoulders 39 and 40 being such as to in effect grip the retaining bumps 18 therebetween similarly as the shoulders 28 and 31 of the cover 19 grip the retaining bumps therebetween. At the outer extremity, the cover portion 37 has a generally radially outwardly turned marginal portion 41 terminating in an underturned reinforcing and finishing flange 42, with the portion 41 providing with the terminal flange a substantial chamber for reception of wheel balancing weights. Application of the cover 34 to the outer side of the wheel may be effected substantially as described in connection with the cover 19 and pry-off may be similarly effected by inserting a pry-off tool behind the cover marginal portion 41 and engaging in pry-off leverage relation the heating shoulder 40.

In FIGURE 5 a cover 43 is provided which in most respects is similar to the cover 34, having a central crown portion of preferred shape provided thereabout with an inwardly dished intermediate portion 44 leading to a generally radially and axially outwardly extending portion 45 for overlying the tire rim shoulder 13 and terminating in a generally radially outwardly extending marginal portion 47 having an underturned reinforcing and finishing flange 48. For reception and retaining engagement with the retaining bumps 18, the cover portion 45 has an annular generally radially and axially inwardly projecting channel-rib 49 that is provided at its axially inner side with a bump engaging shoulder 50 and at its axially outer side with a bump seating shoulder 51, the shoulders being spaced apart sufficiently to receive the retaining bumps 18 in gripped relation therebetween and with the bumps extending freely into the channel of the rib 49 in clearance relation. Application and removal of the cover 43 is effected the same as either of the covers 19 or 34, that is, by application of a pry-off tool behind the margin of the cover and in engagement with the shoulder 51.

In order to provide means for holding the cover 43 against turning, the rib 49 may be provided at suitable intervals with indented transverse ribs 52 which will oppose the adjacent opposite sides of one of the retaining bumps 18 received therebetween. In a sense, the indented transverse ribs 52 sub-divide the channel-rib 49 into a plurality of pockets within which the retaining bumps 18 are adapted to be received as shown in FIGURE 6. It may also be observed that the transverse ribs 52 afford additional reinforcement and resilient stiffening for the retaining shoulder 50 and the seating shoulder 51 by resisting spreading apart of the shoulders in snapping of the shoulder 50 over the retaining bumps.

In FIGURES 7, 8 and 9, a cover 53 is shown which is adapted for snap-on, pry-off disposition at the outer side of the wheel but has retaining finger structure instead of retaining shoulders in the body portion of the cover as described in connection with the covers 19, 34 and 43. To this end, the cover 53 includes a central crown portion 54 having thereabout an inwardly generally dished intermediate portion 55 leading to a generally radially and axially outwardly extending outer marginal portion 57 joined to the intermediate portion on an indented reinforcing and pry-off rib 58. The outer edge of the marginal portion 57 is provided with an underturned reinforcing and finishing flange portion 59 adapted to lie opposite the tip of the terminal flange portion 15.

Provided as integral one-piece extensions from the underturned narrow finishing flange 59, and in practice derived from four corners of a quadrangular blank, is a series of circumferentially spaced cover retaining fingers 60 which extend generally radially and axially inwardly opposite the pry-off shoulder 58 and engageable with the retaining bumps 18 which are receptive within clearance embossments 61 in the central portions of the retaining fingers and projecting generally radially and axially inwardly and defined at their axially inner sides by bump engaging retaining shoulders 62 and at their axially outer sides by seating shoulders 63, with the remainder of the retaining fingers held in spaced relation thereby to the tire rim and more particularly the shoulder juncture 13.

Projecting axially inwardly beyond the bump receiving embossments 18 and the shoulders 62 thereof are respective reinforcing turned extremities 64 preferably turned generally radially inwardly while projecting generally axially inwardly, and opposing the intermediate flange 12 in a manner to afford a cushioned thrust pad to minimize distorting or leverage flexing movements of the retaining fingers and affording a stabilizing back-up against the intermediate flange 12. The terminal extensions 64 also facilitate camming of the fingers over the retaining bumps 18 at the opposite side of the cover from a valve stem aperture 65 when such aperture is registered with the valve stem of the wheel in the course of applying the cover to the outer side of the wheel. Aside from the possible engagement of the retaining finger terminal portions against the intermediate flange 12 of the tire rim, the cover is entirely supported upon and is retained by the retaining bumps 18.

When it is desired to remove the cover 53 from the wheel, a pry-off tool is inserted behind the outer marginal portion 57 of the cover and engaged with the pry-off shoulder 58 if between the retaining fingers 60, and behind the seating shoulder 63 if applied in general alignment with one of the retaining fingers 60.

It may be observed in FIGURE 7 that by disposition of the reinforcing and pry-off shoulder 58 adjacent to the seating shoulder 63 and axially outwardly adjacent to the bump receiving embossments 61, axially inward pressure against the outer side of the cover that might tend to warp or distort the cover will be resisted by deflection of the shoulder rib 58 against the axially outer side of the respective embossments 61.

As shown herein, of course, all forms of the cover are interchangeably usable on the same wheel.

It will be understood that modifications and variations may be effected without departing from the scope of the novel concepts of the present invention.

I claim as my invention:

1. In a wheel structure including a tire rim having intermediate and terminal flanges joined on a rounded shoulder having pressed generally radially inwardly and axially outwardly therefrom cover retaining bumps, a cover for disposition on the outer side of the wheel including a circular member made from sheet material and having an annular groove therein opening toward the bumps and provided at opposite sides thereof with shoulders between which the bumps are engaged and support the cover in completely spaced relation to the wheel except for the engagement with the bumps, said groove having pockets therein within which the bumps are received.

2. In a wheel structure including a tire rim having intermediate and terminal flanges joined on a rounded shoulder having pressed generally radially inwardly and axially outwardly therefrom cover retaining bumps, a cover for disposition on the outer side of the wheel including a circular member made from sheet material and having an annular groove rib therein opening toward the bumps and provided at opposite sides thereof with shoulders between which the bumps are engaged and support the cover in completely spaced relation to the wheel except for the engagement with the bumps, said groove rib being provided with a plurality of indentations providing turn-preventing stops opposing the sides of the retaining bumps.

3. In a cover for disposition at the outer side of a vehicle wheel having retaining bumps at juncture of the intermediate and terminal flanges and projecting generally radially and axially outwardly, a circular cover member having an annular generally radially and axially outwardly projecting portion formed with an annular rim shoulder clearing groove that opens generally radially outwardly and axially inwardly and is defined at axially and radially inner and radially and axially outer sides thereof with radially offset generally opposing shoulders between which retaining bumps are adapted to be gripped for retaining the cover in snap-on, pry-off relation on a wheel and supporting the cover on such bumps, said groove having at circumferentially spaced intervals generally radially outwardly and axially inwardly opening deeper pockets therein for clearing such bumps.

4. In a cover for disposition at the outer side of a vehicle wheel having retaining bumps at juncture of the intermediate and terminal flanges and projecting generally radially and axially outwardly, a circular cover member having an annular generally radially and axially outwardly projecting portion formed with an annular rim shoulder clearing groove that opens generally radially outwardly and axially inwardly and is defined at axially and radially inner and radially and axially outer sides thereof with radially offset generally opposing shoulders between which retaining bumps are adapted to be gripped for retaining the cover in snap-on, pry-off relation on a wheel and supporting the cover on such bumps, said groove being sub-divided by a plurality of transversely indented portions serving as reinforcing ribs and turn-preventing shoulders engageable with the sides of such bumps.

5. In a wheel structure including a wheel body and a tire rim supported thereby, the tire rim having a generally axially extending intermediate flange joined to a generally radially outwardly and then axially outwardly extending terminal flange with a circumferentially spaced plurality of cover retaining bumps projecting radially inwardly and axially outwardly at juncture of the intermediate and terminal flanges, a circular cover member for disposition in press-on pry-off relation over the outer side of the wheel and having an intermediate annular dished portion defined at its radially outer side by an annular radially and axially outwardly extending slanted cover portion overlying said juncture and projecting radially and axially outwardly therebeyond and terminating in a marginal portion projecting angularly generally radially outwardly with its edge in adjacent relation to the tip of the axially extending terminal flange portion, said slanted cover portion having intermediately therein a generally radially inwardly and axially outwardly projecting annular rib defining a groove opposing said juncture and opening generally radially outwardly and axially inwardly, said rib having at radially inner side thereof at juncture with the slanted cover portion, a cover retaining rib engageable under resilient tension with the radially and axially inner sides of said bumps, and said rib having at the radially outer side thereof at juncture with said slanted cover portion, a shoulder engageable under resilient tension with the radially and axially outer sides of said bumps, engagement of said bumps by said shoulders retaining the cover against displacement off the wheel and maintaining the cover in entirely supported relation by said bumps.

6. A wheel structure as defined in claim 5 wherein said rib has projecting into the groove thereof means to oppose the opposite circumferential sides of the bumps to hold the cover against turning on the wheel.

7. In a wheel structure including a tire rim having a generally axially extending intermediate flange joining a generally radially outwardly and then axially outwardly extending terminal flange with generally radially inwardly and axially outwardly projecting protrusions pressed from the juncture of the intermediate and terminal flanges and providing cover retaining bumps, a circular cover member for disposition over the outer side of the wheel including an annular radially and axially outwardly slanted portion opposing said bumps and projecting radially and axially outwardly therebeyond and having a generally radially outwardly extending marginal terminal portion overlying the terminal flange, said slanted portion having a circumferentially spaced series of radially outwardly and axially inwardly opening embossed pockets therein which are provided with cover retaining shoulders engageable with respectively the radially and axially inner and the radially and axially outer sides of the respective bumps under resilient tension for thereby maintaining the cover on the wheel.

References Cited in the file of this patent

UNITED STATES PATENTS

| | | |
|---|---|---|
| 2,308,617 | Lyon | Jan. 19, 1943 |
| 2,368,249 | Lyon | Jan. 30, 1945 |
| 2,569,483 | Lyon | Oct. 2, 1951 |
| 2,621,978 | Lyon | Dec. 16, 1952 |
| 2,624,640 | Lyon | Jan. 6, 1953 |
| 2,631,066 | Horn | Mar. 10, 1953 |
| 2,631,895 | Hunt | Mar. 17, 1953 |
| 2,683,628 | Lyon | July 13, 1954 |
| 2,683,632 | Lyon | July 13, 1954 |
| 2,805,893 | Lyon | Sept. 10, 1957 |

FOREIGN PATENTS

| | | |
|---|---|---|
| 830,302 | Germany | Feb. 4, 1952 |
| 495,641 | Canada | Sept. 1, 1953 |
| 1,100,164 | France | Mar. 30, 1955 |
| 531,996 | Italy | Aug. 8, 1955 |